(12) United States Patent
Narayanan et al.

(10) Patent No.: US 8,335,763 B2
(45) Date of Patent: Dec. 18, 2012

(54) CONCURRENTLY PRESENTED DATA SUBFEEDS

(75) Inventors: Raman Narayanan, Bellevue, WA (US); Rajenda Vishnumurty, Bellevue, WA (US); Ming Liu, Redmond, WA (US); Russell Songco, Seattle, WA (US); George Moromisato, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 12/631,313

(22) Filed: Dec. 4, 2009

(65) Prior Publication Data

US 2011/0137894 A1 Jun. 9, 2011

(51) Int. Cl.
*G06F 7/00* (2006.01)
(52) U.S. Cl. ........................................... 707/628
(58) Field of Classification Search ............. 707/610, 707/628, 631
See application file for complete search history.

(56) References Cited

U.S. PATENT DOCUMENTS

| | | | |
|---|---|---|---|
| 2006/0253459 | A1 | 11/2006 | Kahn |
| 2007/0016609 | A1* | 1/2007 | Kim et al. ............... 707/104.1 |
| 2007/0214477 | A1 | 9/2007 | Read |
| 2007/0250467 | A1 | 10/2007 | Mesnik |
| 2008/0010337 | A1 | 1/2008 | Hayes |
| 2008/0040673 | A1 | 2/2008 | Zuckerberg |
| 2008/0134035 | A1 | 6/2008 | Pennington |

OTHER PUBLICATIONS

"Active Web Reader 2.49", RSS Reader-Feed Reader: Active Web Reader, Feb. 26, 2004, reprinted from the Internet at: http://www.deskshare.com/awr.aspx, p. 1 of 1.

* cited by examiner

*Primary Examiner* — Truong Vo
(74) *Attorney, Agent, or Firm* — Microsoft Corporation

(57) ABSTRACT

When presenting a news feed (e.g., statuses of contacts in a social media network), it may be inefficient to display the data items in a single column according to a single filter, such as a designated group of contacts. Rather, from the data feed, a set of at least two data subfeeds may be generated based on different filters, and the at least two data subfeeds may be currently presented to the user (e.g., as two or more vertically aligned columns, each presenting a different set of data items based on a different filter.) The user may prefer the concurrent presentation due to the contextual separation of the data items according to different filters, and may more easily administrate the filters and groupings; e.g., dragging data items from one column to another column may alter the filters to achieve a more preferred sorting of data items in future presentations.

18 Claims, 8 Drawing Sheets

CONCURRENTLY PRESENTED DATA SUBFEEDS

BACKGROUND

Within the field of computing, many scenarios involve a presentation of a data feed, such as a set of events in a computing environment, a set of news items published by a news outlet, the statuses of a set of contacts in a social media network, and a set of media items published by a set of media producers. A user may request to view the data feed as a set of data items; e.g., the user may request a column of data items to be displayed as a vertically aligned list or as a tree view. Moreover, among the data items, the user may define a group (e.g., within the user's set of contacts in the social media network, the user may designate a subset of contacts comprising the user's professional colleagues), and may request a view of the data feed filtered according to the group (e.g., a presentation of the statuses of members of the professional colleagues group.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Scenarios involving the presentation of a data feed may be difficult or inefficient in various aspects. As a first example, when data items of a data feed are presented in a vertical list, the presentation may inefficiently utilize the width of the display, particularly in view of the prevalence and popularity of wide display devices and of multiple displays arranged in a horizontal configuration. As a second example, it may be inefficient for a user to issue several consecutive requests to filter the data feed according to various groups; e.g., a particular data item might be redundantly displayed in many such presentations, contrary to the preferences of the user. As a third example, it may be difficult for the user to create and manage the groups whereby the data feed might later be filtered.

Alternative techniques for presenting the data feed that might present various advantages involve generating various data subfeeds, each comprising a subset of the data items of the data feed, and concurrently presenting the data subfeeds to the user. For example, in a social media network, the user's contacts might be separated in various groups, such as "Friends," "Professional Contacts," "School Contacts," and "Everyone Else," and four columns may be concurrently presented to the user in vertical alignment (e.g., having the same Y-axis positions and column heights within the display space), with each column presenting a vertical list of the statuses of the represented contacts. The concurrent presentation of groups (in the exemplary columnar layout or in a different layout) may enable more efficient use of the display space of the user's display device, and may more efficiently present the data feed to the user with contextual grouping. Additionally, concurrently presenting several data subfeeds may permit additional filtering, e.g., by restricting a particular data item to appear in only one displayed data subfeed in order to reduce redundancy, and by allowing the user to transfer data items between data subfeeds in order to manage the filters associated therewith. These and other advantages may be achieved by concurrently displaying various data subfeeds of a data feed in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
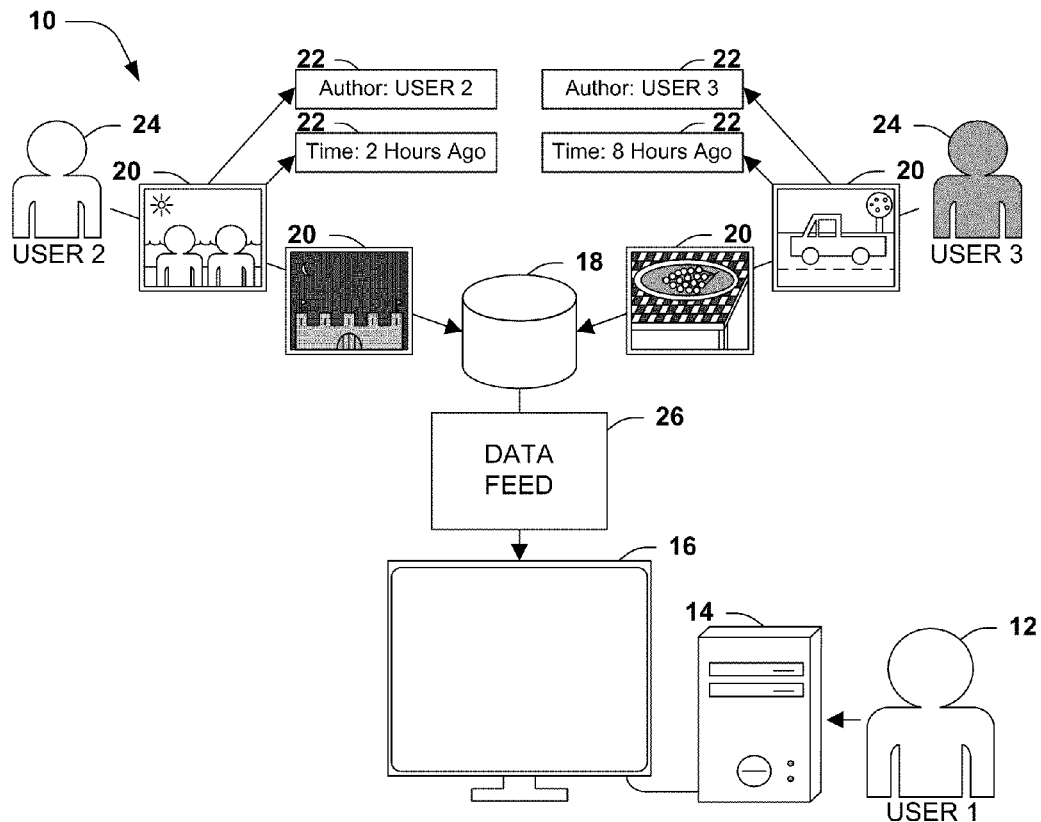
FIG. 1 is an illustration of an exemplary scenario featuring a submission of data items comprising a data feed requested by a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a presentation of a data feed to a user, where the data feed comprises a set of data items. As a first example, a set of notifications arising within the computing environment, such as the receipt of email, antivirus scans, and the completion of disk management processes, may be presented to alert a user of relevant events. As a second example, a user may subscribe to a source of news, such as via a Really Simple Syndication (RSS) feed subscription offered by an RSS publisher of a particular type of data, and a subscription client may present the syndicated data items to the user upon receipt. As a third example, a user of a social media network service may select a set of contacts, and may wish to view the status updates posted by these contacts in some order (e.g., sorted chronologically or by popularity.) As a fourth example, a user may be interested in a set of data items posted to a data sharing service, such as files uploaded to a file store or photos uploaded to a photo sharing service, and may request a list of new data items.

FIG. 1 presents an illustration of an exemplary scenario 10 involving a user 12 operating a device 14 (such as a personal computer, a cellphone, or a personal data assistant) having a display 16. The user 12 may access a service 18 that stores a set of data items 20, such as a photo server hosting a set of photos submitted by various contributors 24. Respective data items 20 may include some content (e.g., the digital image comprising a photo; the text comprising document; or the digital video and audio comprising a movie), and may also include one or more metadata items 22 that describe the content, such as the author of an image or photographer of a photo; the date and time when the image was completed or the photo was captured; a caption, description, or set of keywords describing the contents; and the equipment used to generate the image or photo. The user 12 may wish to access the data items 20 as a data feed 26, whereby the user 12 may be notified of the receipt of new data items 20 by the service 18, such as the uploading of new photos by the contributing users. The user 12 may be notified of such occurrences through a "pull" mechanism, e.g., upon user request, and/or through a "push" mechanism, e.g., by being spontaneously notified by the service 18 upon receipt of one or more new data items 20.

Figure 2:
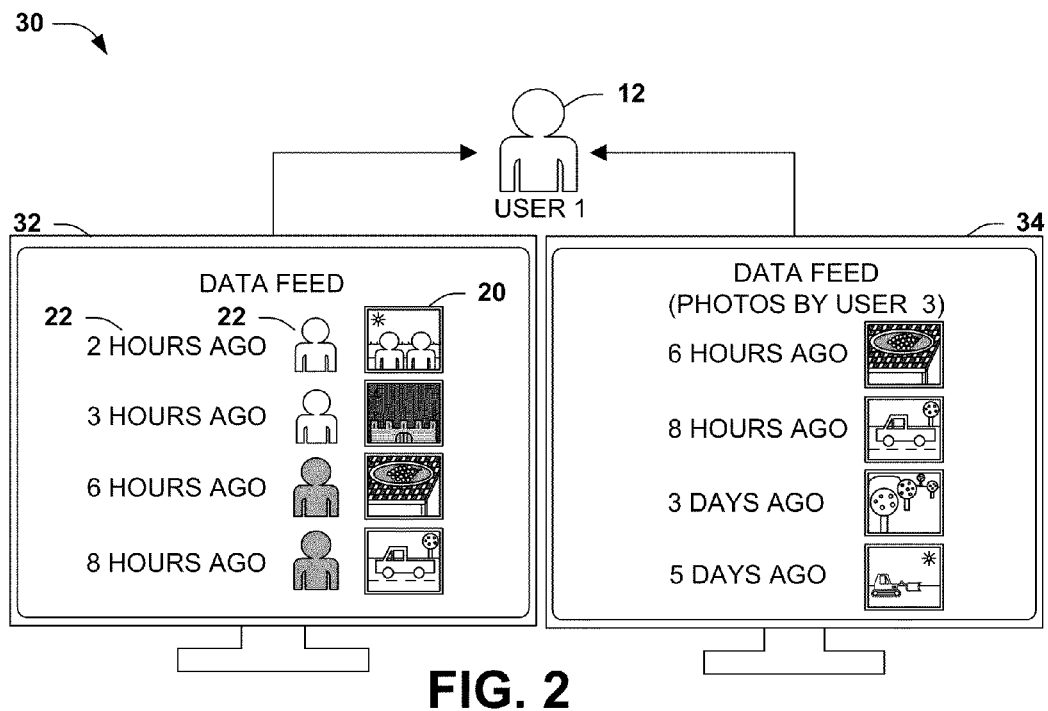
FIG. 2 is an illustration of two exemplary presentations to the user of the data feed illustrated in FIG. 1.

In the exemplary scenario 10 of FIG. 1, the user 12 may configure the device 14 to retrieve the data feed 26, and to present the data feed 26 on the display 16 of the device 14. However, the data feed 26 may be presented to the user 12 in various ways. FIG. 2 presents an illustration of an exemplary scenario 30 featuring two different presentations to the user 12 of the data items 20 comprising the data stream 26 of FIG. 1. The first exemplary presentation 32 of FIG. 2 features a simple presentation of the complete data feed 26, comprising all of the data items 20 of the data feed 26 along with some of the metadata items 22. The data items 20 are presented in horizontal alignment as a vertical column, and may be sorted in various ways (e.g., sorted chronologically as per the first exemplary presentation 32, or sorted by popularity or rating.) Alternatively, the user 12 may wish to view a subset of the data items 20. For example, the user 12 may define a group of contributors whose photos are of particular interest (e.g., contributors who are also friends or family members of the user 12), and may request to view the subset of data items 20 in the data feed 26 submitted by members of this group. The device 14 may therefore present on the display a second exemplary presentation 34 of the data feed 26, comprising only the data items 20 submitted by members of the group. In this exemplary scenario 30, the second user may not be a member of the defined group, but the third user may be, so the data items 20 generated by the third user are presented in the second exemplary presentation 34 (along with one or more metadata items 22 describing the respective data items 20, such as the time of the image.) In this manner, the device 14 may display different presentations of the data feed 26 according to the interests of the user 12.

However, the exemplary presentations illustrated in the exemplary scenario 30 of FIG. 2 may indicate some potential disadvantages with these techniques for presenting the data feed 26 to the user 12. As a first example, it may be appreciated that some data feeds 26 may be frequently updated, such as by a data source that submits many data items 20, or by a large set of data sources (e.g., a data feed 26 of photos that may be submitted by a large body of contributing users.) These data feeds 26 may be difficult to follow according to the first exemplary presentation 32 comprising the entire set of data items 20 of the data feed 26, because the data feed 26 may be updated too quickly for the user 12 to follow as an updating set of data items 20. Upon each viewing, the user 12 may be presented with a different set of new data items 20, instead of a small set of new data items 20 submitted after the previously viewed data items 20; and the user 12 may have difficulty finding older data items 20 of interest within the rapidly updated data feed 26. As a second example, if the data feed 26 is presented as a vertical column of horizontally aligned data items 20 (whether or not restricted to a particular group or subset), it may be appreciated that a considerable amount of lateral display space may be unused; e.g., a window hosting the presentation of the data feed 26 may include significant whitespace to the left or right of the columnar presentation of the data feed 26. This inefficient use of horizontal display space may be exacerbated, e.g., by the increasing prevalence of wide display devices (such as monitors having a comparatively high width-to-height aspect ratio), and/or by the increasing popularity of multi-display computer configurations with displays arranged horizontally to present a comparatively wide display space. As a third example, it may be difficult for the user to define and maintain various groups (e.g., frequent maintenance may be involved to keep a current "friends" group of users.) As a fourth example, it may be frustrating for the user to view consecutively many different groups or presentations of the data feed 26. For example, viewing the data feed 26 in various configurations may compel the user 12 to make multiple selections from a "view by group . . . " combo box or other user control. Also, if a particular data item 26 falls within many groups, the user 12 may be presented with the same data item 26 in many different presentations of the data feed 26, thereby increasing the frustration to the user by redundantly presenting the same data item 26 in several presentations and reducing the value of maintaining multiple groups. In these and other ways, it may be inefficient to present the data feed 26 to the user 12 according to the exemplary presentations illustrated in FIG. 2.

Presented herein are alternative techniques for presenting the news feed 26 to the user 12 in a more advantageous manner. These techniques involve passing the data items 20 of the data feed 26 to two or more filters, where each filter specifies a different set of criteria that may be applied to the metadata items 22 of the respective data items 20 of the data feed 26. For example, a first filter might specify a particular set of criteria, such as that the author of the image is from a certain group, and that the image was created within a certain timeframe (e.g., within the current calendar year.) A second filter might specify a different set of criteria, such as that the author of the image is from the same group, but that the image was created within a different timeframe (e.g., within the previous calendar year.) Each filter may be applied to the metadata items 22 of respective data items 20, and some data items 20 may pass through the filter to create a data subfeed, while others are excluded by the filter and from the data subfeed. Therefore, each filter produces a different data subfeed, each comprising a subset of data items 20 from the data feed 26. (Each data subfeed may contain a distinct set of data items 20 as compared with any other data subfeed; or may contain an identical set of data items 20 as another data subfeed, but may have selected the same data items 20 according to a different set of criteria.) After at least two data subfeeds have been generated according to different filters, the data subfeeds may be concurrently presented to the user 12 as a different data subfeed group on a display of a device. For example, the data subfeeds may be presented as two or more vertically aligned columns, each column presenting a horizontally aligned set of data items 20 comprising a different subfeed.

Figure 3:
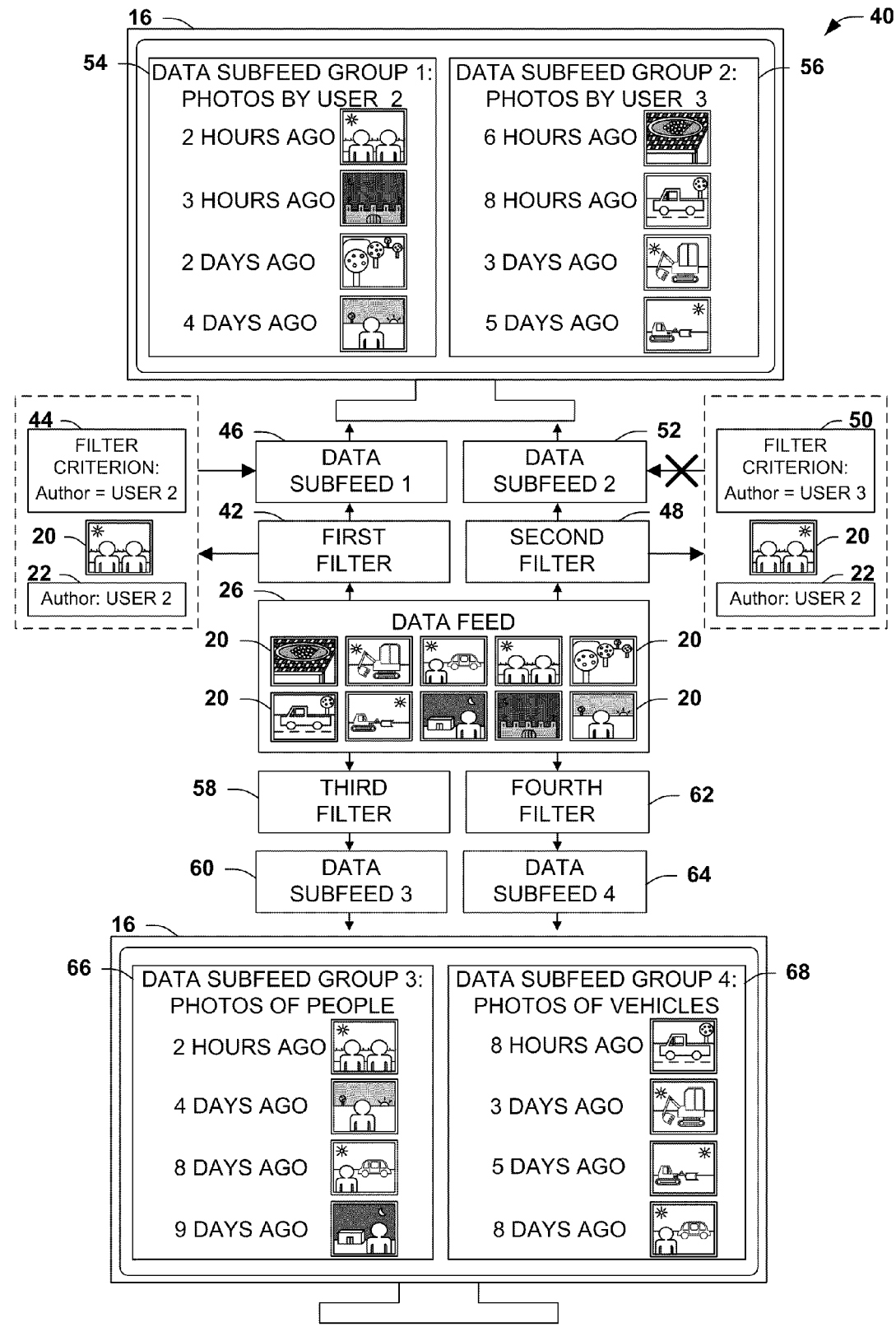
FIG. 3 is an illustration of two exemplary presentations to the user of the data feed illustrated in FIG. 1, the exemplary presentations generated in accordance with the techniques presented herein.

FIG. 3 presents an exemplary scenario 40 featuring two different presentations of the data items 20 comprising a data feed 26 in accordance with the techniques discussed herein. The data subfeed 26 comprises a series of data items 20, each having one or more metadata items 22 that describe the contents of the data item 20. The data feed 26 may be exposed to a first filter 42, and the respective data items 20 of the data feed 26 may be compared with one or more criteria of the first filter 42. For example, the first filter 42 may comprise a criterion 44 specifying that only data items 20 generated by the user identified as "User 2" are to be selected, and that nonmatching data items 20 are to be excluded. The data items 20 that match the criteria of the first filter 42 may be selected for a first data subfeed 46. Similarly, a second filter 48 may be applied to the data feed 26 with a different set of criteria (e.g., a criterion 50 indicating that only data items 20 created by the user identified as "User 3" are to be included), and the data items 20 matching the criteria of the second filter 48 may be selected to comprise a second data subfeed 52. The first data subfeed 46 and the second data subfeed 52 may then be concurrently displayed as a first data subfeed group 54 and a second data subfeed group 56, respectively, on the display 16 of a device, such as a computer. According to the exemplary scenario 40 of FIG. 3, the first data subfeed 46 may be presented as a first data subfeed group 54 oriented as a first column of horizontally aligned data items 20, and (in this exemplary presentation) one or more metadata items 22 presented therewith; and the second data subfeed 52 may be concurrently presented as a second data subfeed group 56 oriented as a second column of horizontally aligned data items 20, where the second column is vertically aligned with and positioned in lateral adjacency with respect to the first column. Alternatively or additionally, the data feed 26 may be exposed to a third filter 58 having a different set of criteria (e.g., images comprising photos of people) that may be compared to the metadata items 22 of respective data items 20 (e.g., descriptive keywords, topical tags, or descriptors of objects in the image identified by image recognition algorithms) to generate a third data subfeed 60 that may be presented on the display 16 as a third data subfeed group 66, and/or a fourth data filter 62 to generate a fourth data subfeed 64 that may be presented on the display 16 as a fourth data subfeed group 68. A particularly large or high-resolution display 16 might present more than two data subfeed groups; e.g., on a particularly wide display 16, all four columns may be displayed to present four different data subfeeds to the user 12, each comprising a different set of data items 20 that are contextually related according to the criteria of a different filter.

As per these techniques and as illustrated in FIG. 3, the data feed 26 may be presented to the user 12 as a set of data subfeeds, each comprising a different set of data items 20 (or, at least, a similar set of data items 20 selected according to a different set of criteria.) This presentation may present several advantages with respect to other presentation techniques (such as illustrated in the exemplary scenario 30 of FIG. 2.) As a first example, the concurrent presentation of two or more data subfeeds might improve the user's review of the contents of the data feed 26, particularly where the data feed 26 includes a large number of data items 20 and/or is frequently updated. The data feed 26 is thereby segmented into a set of smaller data subfeeds, each comprising a smaller set of data items 20 with a particular contextual theme that may be of interest to the user 12. As a second example, the concurrent presentation of data subfeeds in different data subfeed groups (e.g., as a set of vertically aligned columns) may more efficiently utilize the lateral area of the display 16 of the user's device. As a third example, in some implementations of these techniques, a data item 20 may be prevented from being included in more than one concurrently displayed data subfeed group in order to reduce the redundant presentation of the data item 20 to the user 12. As a fourth example, in some embodiments, the user 12 may be permitted to manipulate the data items 20 of the respective data subfeeds, and such actions may be used to adjust the filters associated with the corresponding subfeeds. For example, if a user 12 drags a data item 20 from a first column to a second column, the criteria of the first filter corresponding to the first column may be adjusted to exclude the data item 20 (and, perhaps, other data items 20 that are inferred to be similar to the moved data item 20) from the first column, while the criteria of the second filter corresponding to the second column may be adjusted to promote the inclusion of the moved data item 20 (and, perhaps, other data items 20 that are inferred to be similar to the moved data item 20) in future presentations thereof. These and other potential advantages may be achieved, and/or disadvantages may be reduced, by presenting the data feed 26 according to the techniques discussed herein.

Figure 4:
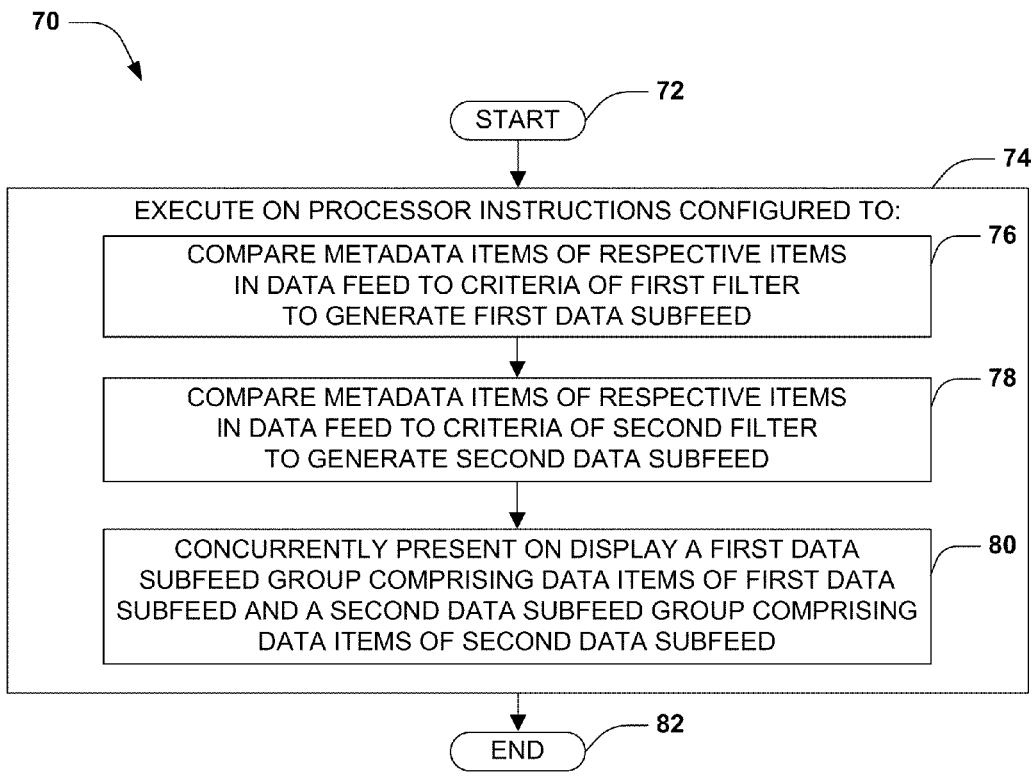
FIG. 4 is a flow chart illustrating an exemplary method of presenting a data feed comprising at least one data item on a display of a device.

FIG. 4 presents a first embodiment of these techniques, illustrated as an exemplary method 70 that may be achieved using a device having a processor and a display 16. The exemplary method 70 begins at 72 and involves executing 74 on the processor instructions configured to present a data feed 26 comprising at least one data item 20, where respective data items 20 have at least one metadata item 22. In the exemplary embodiment 70 illustrated in FIG. 4, the instructions are configured to compare 76 the metadata items 22 of respective data items 20 of the data feed 26 to criteria of a first filter 42 to generate a first data subfeed 46, and to compare 78 the metadata items 22 of respective data items 20 of the data feed 26 to criteria of a second filter 48 to generate a second data subfeed 52. The instructions are also configured to concurrently present 80 on the display 16 a first data subfeed group 54, comprising the data items 20 of the first data subfeed 46, and a second data subfeed group 56 comprising the data items 20 of the second data subfeed 52. Having achieved the presentation of the data feed 26 according to the techniques discussed herein, the exemplary method 70 ends at 82.

FIG. 4 presents an exemplary scenario 90 featuring a second exemplary embodiment of the techniques discussed herein. The exemplary scenario 90 features a device 92 having a processor 94 and a display 96 whereupon a data feed 26, comprising at least one data item 20 where respective data items 20 have at least one metadata item 22, may be presented to a user 12. The device 92 has access to the data feed 26, and also a first filter 42 and a second filter 48, respectively comprising a different set of criteria that may be applied to the data items 20 of the data feed 26 in order to generate a different data subfeed. Within this exemplary scenario 90, the techniques discussed herein may be implemented as an exemplary system 98 configured to present the data feed 26 on the display 96. The exemplary system 98 comprises a data subfeed generating component 100, which is configured to compare the metadata items 22 of respective data items 20 of the data feed 26 to criteria of the first filter 42 to generate a first data subfeed 46, and to compare the metadata items 22 of respective data items 20 of the data feed 26 to criteria of the second filter 48 to generate a second data subfeed 52. The exemplary system 98 also comprises a data subfeed presenting component 102, which is configured to concurrently present on the display 96 a first data subfeed group 104 comprising the data items 20 of the first data subfeed 46, and a second data subfeed group 106, comprising the data items 20 of the second data subfeed 52. By implementing the components of the exemplary system 98 configured in this manner, one of ordinary skill in the art may achieve the presentation of the data feed 26 to the user 12 according to the techniques discussed herein.

Figure 5:
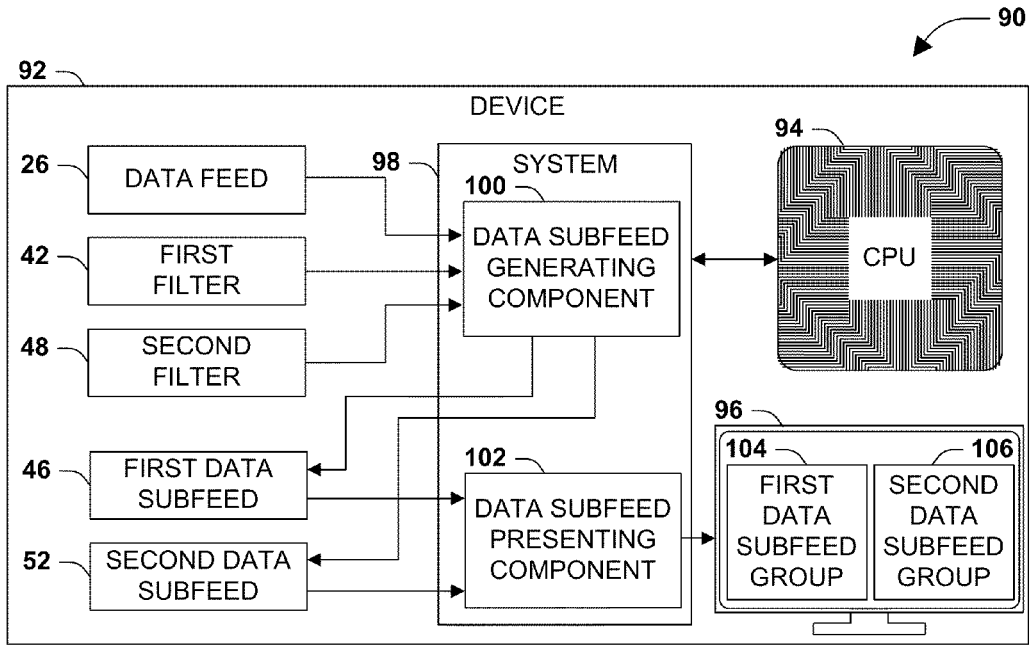
FIG. 5 is a component block diagram illustrating an exemplary system for presenting a data feed comprising at least one data item on a display of a device.
Figure 6:
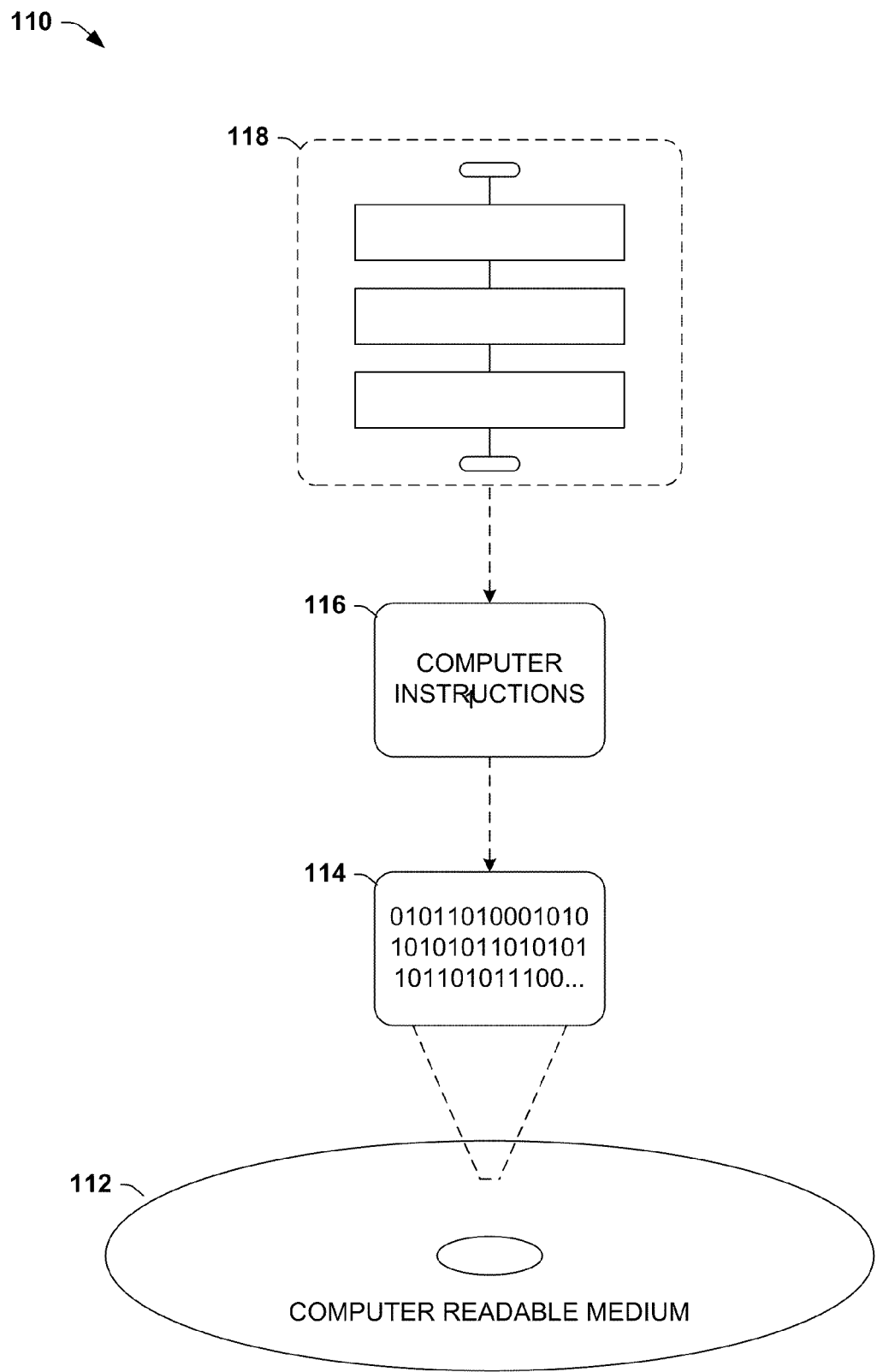
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to perform a method of presenting a data feed comprising at least one data item on a display of a device, such as the exemplary method 70 of FIG. 4. In another such embodiment, the processor-executable instructions 116 may be configured to implement a system for presenting a data feed comprising at least one data item on a display of a device, such as the exemplary system 98 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 4 and the exemplary system 98 of FIG. 5) to confer individual and/or synergistic advantages upon such embodiments.

A first aspect that may vary among embodiments of these techniques relates to the scenarios wherein these techniques may be utilized. As a first example of this first aspect, the techniques may be utilized with many types of devices featuring displays, such as a workstation computer having a large display, possibly comprising several monitors positioned laterally to present a comparatively wide display space; a portable personal computer, such as a netbook, having a somewhat smaller display; and a mobile phone having a comparatively small display. The device might also comprise a set of two or more devices; e.g., a server, such as the server of the data feed 26, may generate the data subfeeds, and may send the data subfeeds to a device 14 operated by the user 12 for presentation on the display 16 of the device 14. As a second example of this first aspect, many types of implementations may be devised that embody the techniques discussed herein. For example, in the exemplary scenario 90 of FIG. 5, respective components of the exemplary system 98 may be implemented as, e.g., a volatile memory (such as system RAM) or static memory (such as flash RAM) comprising instructions that implement the architecture of one or more components and the respective configurations thereof; a static circuit, such as a semiconductor, that is configured to perform the logic of the component; a programmable circuit, such as an FPGA or EEPROM, that is configured to perform the logic of the component; or a combination of such implementations.

As a third example of this first aspect, the data feed may comprise many types of data items 20 representing various types of items, such as notable events arising within a computing environment; media objects, such as documents, pictures, sounds, videos, or three-dimensional models; data objects, such as applications, databases or database records, or files; representations of physical entities, such as devices or individuals; or a combination of such objects. The data items 20 comprising the data feed 26 might also include many types of data, including the full contents of the data item 20; a description of the data item 20 (e.g., a thumbnail version or text description of an image or photo, or the first few lines of a document); one or more metadata items 22 associated with the data item 20; a link to access the data item 20; or simply a notification that one or more new data items have been received. The data feed 26 may also be received and/or compiled from one or more data sources; e.g., the data feed 26 may comprise a first data item 20 received from a first data source (such as a first user or a first server) and a second data item 20 received from a second data source (such as a second user or a second server.) Those of ordinary skill in the art may devise many such scenarios wherein the techniques discussed herein may be advantageously utilized.

A second aspect that may vary among embodiments of these techniques relates to the manner of generating one or more filters used to select data items 20 from the data feed 26 to comprise a data subfeed. As a first example of this second aspect, the filter may use many types of criteria, while performing the selection of data items 20, including criteria that utilize Boolean logic (e.g., specifying particular features of metadata items 22 that are to be exactly or approximately matched to include a data item 20 in the data subfeed, or to exclude a data item 20 from the data subfeed) and/or fuzzy logic (e.g., a scoring system that estimates the comparative degree of belonging of a data item 20 to a particular data subfeed, based on an iterative evaluation of the metadata items 22 of the data item 20.) As a second example of this second aspect, the filter may apply many types of evaluative processes to the data items 20, including an expert system based on a set of heuristics, a neural network, a genetic algorithm, a Bayesian classifier, an explicitly programmed logical hierarchy or flowchart, or various other forms of statistical and/or logical analysis.

As a third example of this second aspect, the filter may apply the criteria to one or more aspects of respective data items 20; e.g., by applying a criterion to one metadata item 22 (e.g., "select all images authored by the second user"), to several metadata items 22 (e.g., "select all images having the word 'cow' in the filename, caption, or description of the image"), or to the metadata items 22 of several items (e.g., "examine all of the images generated by the second user, and select the image having the latest creation date and time.") The metadata items 22 may also be stored inside the data item 20, stored with the data item 20 (e.g., in an encapsulation container), stored separately from but associated with the data item 20 (e.g., in a metadata table of a database), and/or synthesized in relation to the content or other metadata items of the data item 20 (e.g., metadata indicating the objects presented in an image that may be generated by applying an image recognition algorithm to the image.)

As a fourth example of this second aspect, the logic embodied by these criteria and/or implemented by these evaluative processes may be generated in many ways. In a first set of embodiments of this fourth example, the logic may be specified by one or more users 12 (including a user who generates the data items 20, a user who provides the data feed 26, and/or the user 12 to whom the data feed 26 is to be presented.) For example, such users may select one or more criteria for selecting data items 20 to comprise a data subfeed, including one or more inclusion criteria specifying at least one metadata item 26 whereby matching data items 20 are included by the filter, and/or one or more exclusion criteria specifying at least one metadata item 22 whereby matching data items 20 are excluded by the filter.

In a second set of embodiments of this fourth example, one or more criteria of a filter may be inferred by identifying one or more commonalities among the metadata items of respective data items 20 in the data feed 26. For example, an embodiment may examine the metadata items 22 of the data items 20 of a data feed 26 in order to identify commonalities among a subset of such data items 20 that may imply a contextual relationship (e.g., authorship by a specific individual or group of individuals; receipt from a particular data source; creation within a particular time frame; and/or shared keywords or topical tags.) The embodiment may therefore generate a filter with criteria specifying such commonalities, and may present the subset of data items 20 as a data subfeed having a contextual basis. In one such embodiment, respective data items 20 may be generated by at least one entity having a relationship with the user 12 to whom the data feed 26 is to be presented; and among the data items 20 of a data feed 26 generated by various entities, at least one commonality may be identified among the metadata items 22 thereof related to the relationships of the entities with the user 12, and this commonality may be included in a filter and used to generate a data subfeed. For example, a data feed 26 comprising a photo stream may feature data items 20 generated by entities having different relationships with the user 12 as represented in a social media network, such as a friend, family, or professional colleague relationship with the user 12. If several data items 20 have metadata items 22 indicating authorship by entities represented as professional colleagues of the user 12, this metadata item 22 may be identified as a commonality among such data items 20, and a "photos created by professional colleagues" filter may be created to generate a corresponding data subfeed of the data feed 26.

Figure 7:
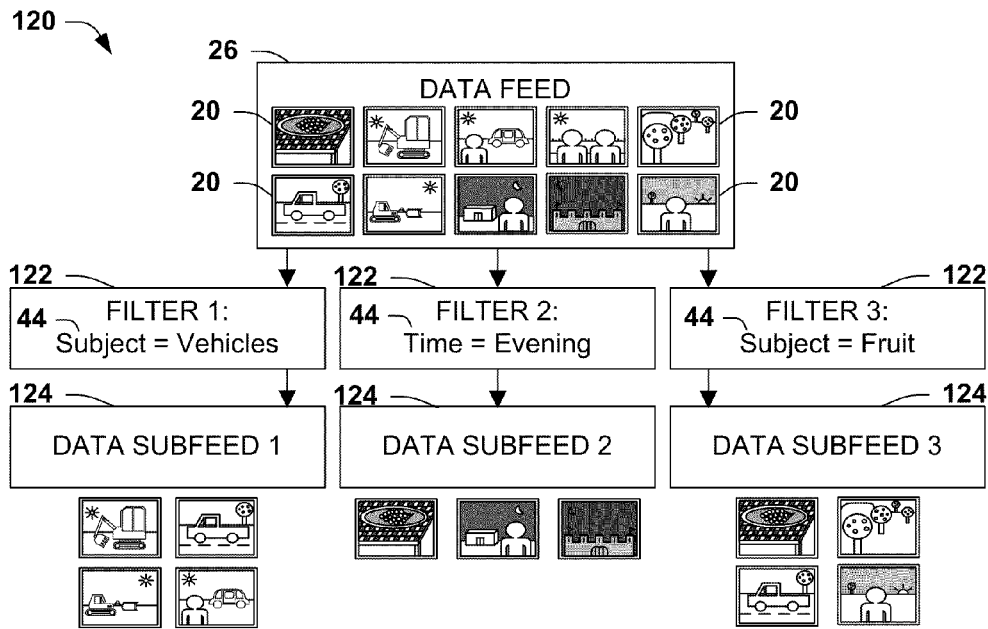
FIG. 7 is an illustration of an exemplary scenario featuring filters inferred from commonalities among the metadata items of the data items of the data feed.

FIG. 7 presents an exemplary scenario 120 featuring the generation of filters 122 of various data subfeeds 124 where the criteria of the filters 122 are selected based on commonalities indentified among the metadata items 22 of respective data items 20 of the data feed 26. In this exemplary scenario 120, the data feed 26 comprises a set of photos that may be associated with various metadata items 22, including the subjects pictured in a particular photo and the time of day depicted in the photo. In an application of these techniques in accordance with this second set of embodiments, a first data subfeed 124 may be generated by identifying a commonality, such as a subset of photos featuring a vehicle as the subject; a second data subfeed 124 may be generated to include photos depicting an evening scene; and a third data subfeed 124 may be generated to include photos having the subject of fruit (including fruit trees.) It may be advantageous, e.g., to identify a commonality that is shared by a desirably small subset of the data items 20, which may lead to a desirably small data subfeed 124. Moreover, the identification of suitable commonalities may continue until many or all of the data items 20 are selected by the filters of at least one data subfeed 124.

In a third set of embodiments of this fourth example, one or more criteria of a filter may be inferred based on actions performed by the user 12, which may indicate various relevant aspects, such as the user's preferences for various data items 20; the user's perceptions of contextual relatedness of various data items 20; affirmation of or disagreement with the criteria of a filter; and/or the representation of underlying groups upon which such criteria are based. For example, such embodiments may identify a user action associated with one or more data items 20, may identify at least one relevant metadata item of the data item 20 that may have motivated the user action, and may infer at least one filter criterion of at least one filter based on the at least one relevant metadata item. The filter may then be used to generate a data subfeed that takes into account the past user actions of the user, such as by improving the contextual relatedness of selected data items 20 or presenting to the user 12 a data subfeed of greater interest, based on the user interests previously expressed by the user 12.

In a first scenario involving this third set of embodiments, a user action may indicate a user interest of the user 12 in a particular data item 20, such as clicking on a thumbnail representation of an image to request a full-size image, or time spent playing a particular video or audio segment that is of apparent interest to the user 12. An embodiment may endeavor to identify at least one relevant metadata item 22 that may have motivated the user interest of the user 12 in the data item 20, and may endeavor to infer at least one filter criterion of a filter based on the relevant metadata items. This embodiment may therefore present or improve a filter that is configured to select data items 20 having the at least one relevant metadata item 22 may motivate the future user interest of the user 12. This filter may resemble a "Favorites" filter, where particular qualities of data items 20 that may have evoked the interest of the user 12 may be used to infer future interest in similar data items 20 that may also be of interest to the user 12.

Figure 8:
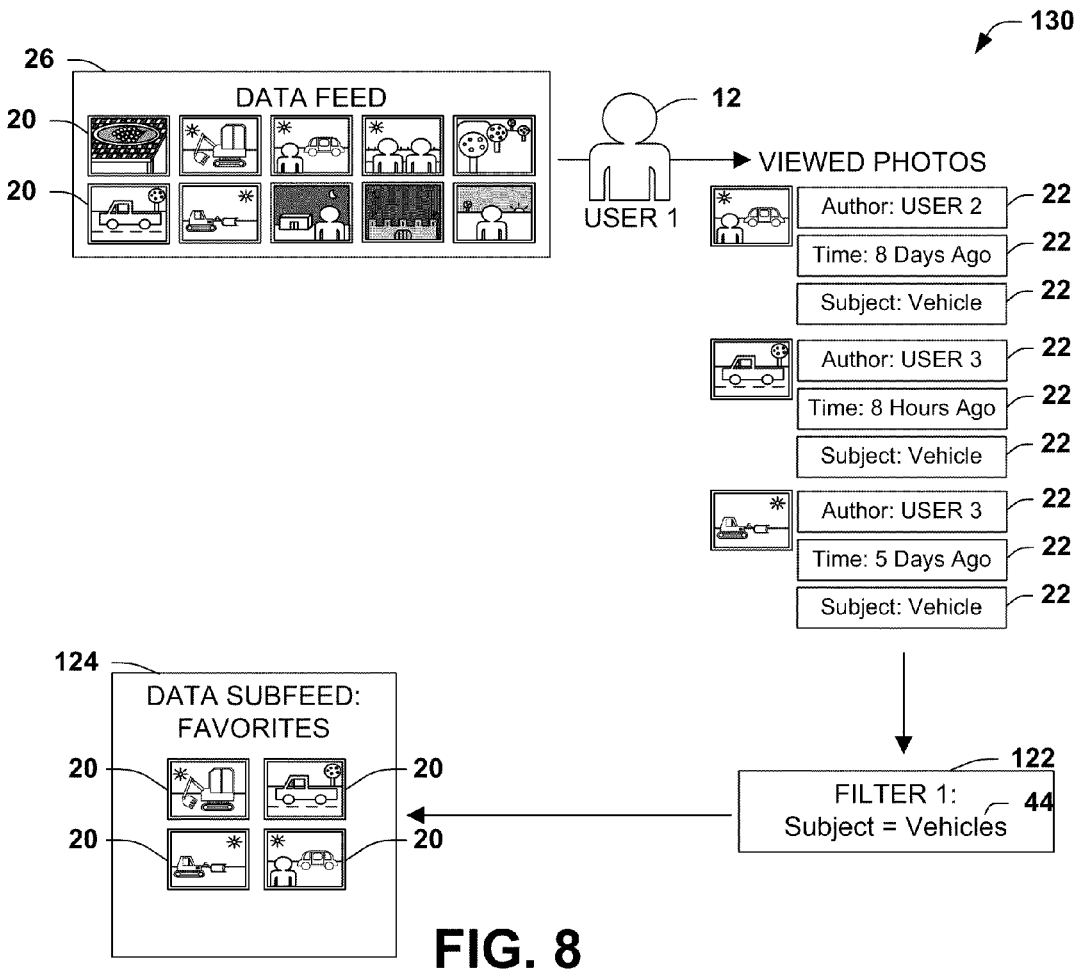
FIG. 8 is an illustration of an exemplary scenario featuring a generation of a filter having criteria inferred through detected user interest in various data items of the data feed.

FIG. 8 presents an exemplary scenario 130 featuring the generation of a filter 122 of a data subfeed 124 where a criterion of the filter 122 is selected based on detected user interest in various data items 20. In this exemplary scenario 130, the data feed 26 comprises thumbnails of various photos, which the user 12 may click to view the full version of the photo. An embodiment may track which photos the user 12 has clicked to view, and may infer a user interest of the user 12 in such photos. Moreover, the embodiment may endeavor to infer the aspects of such photos that have motivated the user interest, such as by identifying commonalities in the metadata items 22 of the viewed photos. In the exemplary scenario 130 of FIG. 8, among the photos comprising the data feed 26, the user 12 has viewed three photos having vehicles as a subject, and this commonality may be identified by comparing the metadata items 22 of the viewed photos. Based on this identified commonality, a new filter 122 may be generated with a criterion 44 based on the commonality. A new data subfeed 124 may be generated comprising the data items 20 that are selected by the filter 122, and a new data subfeed group may be presented on the display as a representation of a "Favorites" data subfeed. For example, the data subfeed 124 may include the three previously viewed photos of vehicles, as well as a fourth photo in the data feed 26 of a vehicle that the user has not yet viewed.

In a second scenario involving this third set of embodiments, the user action may comprise a request to create a new data subfeed comprising at least one data item 20. The embodiment may then endeavor to identify at least one distinctive metadata item 22 of the selected data items 20, in order to determine why the user 12 has requested to create a new data subfeed comprising these data items 20. For example, the metadata items 22 of the selected data items 20 may be compared with the metadata items 22 of unselected data items 20 of other data subfeeds, in order to identify one or more commonalities among the selected data items 20 that are not shared by the unselected data items 20, where such commonalities may imply a distinctive contextual relationship among the selected data items 20. If such distinctive metadata items 22 may be identified, the embodiment may generate a new filter having criteria based on these metadata items 22, which may be utilized to select other data items 20 that share these commonalities, and that the user 12 may wish to include in the new data subfeed. In one such scenario, the data subfeeds may be displayed as vertically aligned columns, and an empty column may be displayed alongside the columns for the data subfeeds. If the user 12 drags one or more data items 20 into the new column, the embodiment may evaluate the dragged data items 20 for commonalities, may generate a new filter with criteria based on the identified commonalities, and may present to the user 12 a new column for a data subfeed generated with the new filter. This embodiment may therefore facilitate a user in creating new data subfeeds in a convenient manner, and populating the data subfeed with other data items 20 that are inferred to be contextually related to the selected data items 20.

Figure 9:
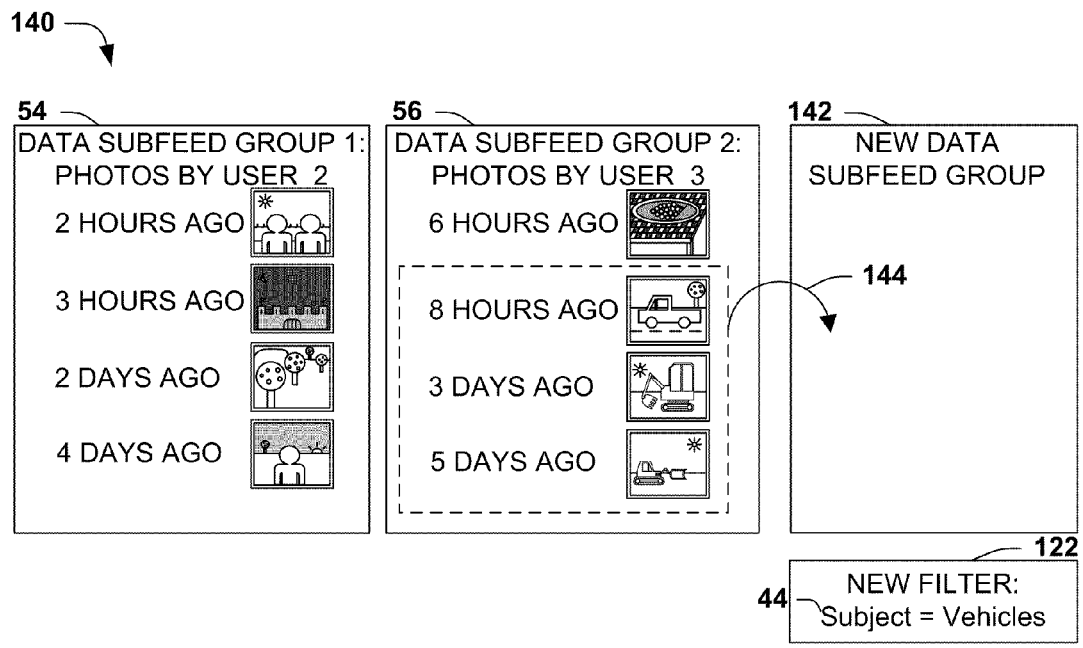
FIG. 9 is an illustration of an exemplary scenario featuring a user action representing a request to create a new data subfeed comprising a set of data items and the generation of a filter having criteria inferred from the metadata items of the selected data items.

FIG. 9 presents an exemplary scenario 140 featuring the generation of a new filter 122 and a new data subfeed 124 based on a user action. In this exemplary scenario 140, alongside a first data subfeed group 54, displayed as a first column and presenting a first data subfeed, and a second data subfeed group 56, displayed as a second column and presenting a second data subfeed, an empty data subfeed group is displayed as an empty column. A user action 144 is detected that involves moving a selected subset of data items 20 to the empty column. An embodiment may interpret this user action 144 as a request to generate a new data subfeed, and may endeavor to generate a new filter 122 with criteria 44 reflecting one or more commonalities among the selected data items 20. For example, in the exemplary scenario 140 of FIG. 9, the user 12 has dragged into the empty column three photos depicting vehicles. A new filter 122 may therefore be generated having a criterion 44 specifying vehicles; a new data subfeed may be generated based on the new filter 122; and a new data subfeed group 142 may be presented to display the data items 20 comprising the new data subfeed. In this manner, the user 12 may conveniently create new data subfeeds with contextual relationships inferred from commonalities among the subset of data items 20 selected for the new data subfeed.

In a third scenario involving this third set of embodiments, the user action may comprise a request to add at least one data item 20 to an existing data subfeed. The embodiment may then endeavor to identify at least one relevant metadata item that may promote the inclusion of the added data item 20 (and similar data items 20) to the data subfeed, such as by identifying at least one relevant metadata item 22 of the selected data item 20 that has a commonality with metadata items 22 of the data items 20 already in the data subfeed. The filter of the data subfeed may then be adjusted by inferring at least one inclusion criterion based on the at least one relevant metadata item 22. Conversely, the user action may comprise a request to remove at least one data item 20 from a data subfeed. The embodiment may then endeavor to identify at least one relevant metadata item that may promote the exclusion of the removed data item 20 (and similar data items 20) from the data subfeed, such as by identifying at least one relevant metadata item 22 of the selected data item 20 that contrasts the metadata items 22 of the data items 20 remaining in the data subfeed. The filter of the data subfeed may then be adjusted by inferring at least one exclusion criterion based on the at least one relevant metadata item 22. These processes may facilitate the user in adjusting the filters of the data subfeeds in order to achieve a more desirable data subfeed (e.g., where the data items 20 of the data subfeed are more contextually related.)

Figure 10:
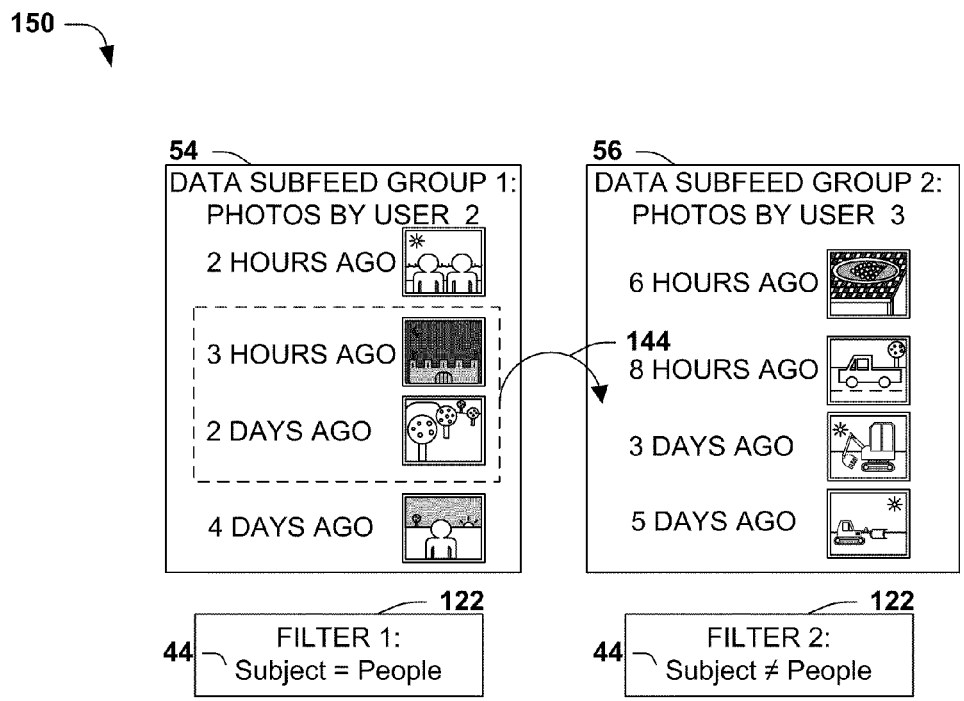
FIG. 10 is an illustration of an exemplary scenario featuring a user action representing a request to move a set of data items from a first data subfeed to a second data subfeed and the updating of the criteria of the respective filters inferred from the metadata items of the selected data items.

FIG. 10 presents an exemplary scenario 150 featuring the moving of a subset of data items 20 (comprising photos in a photo-based data feed 26) from a first data subfeed to a second data subfeed. In this exemplary scenario 150, the first data subfeed is presented as a first data subfeed group 54, displayed as a first column of data items 20 that (according to the criteria of the corresponding filter) were created by the second user, and the second data subfeed is presented as a second data subfeed group 56, displayed as a second column of data items 20 that (according to the criteria of the corresponding filter) were created by the third user. A user action 144 is detected that involves moving a selected subset of data items 20 from the first column to the second column. An embodiment may interpret this user action 144 as a request to adjust the filters associated with the first data subfeed and the second data subfeed in order to reflect the user action 144. As a first example, instead of filtering the data feed 26 for the first data subfeed according to the creator of the data items 20, the filter of the first data subfeed may be adjusted to reflect the commonality among the photos remaining in the first data subfeed group 54, e.g., by inferring a contextual relationship of "photos of people." As a second example, instead of filtering the data feed 26 for the second data subfeed according to the creator of the data items 20, the filter of the second data subfeed may be adjusted to reflect the commonality among the photos already existing and newly placed in the second data subfeed group 56, e.g., by inferring a contextual relationship of "photos without people." Other inferences may also be achieved (e.g., "photos by the second user showing the sun" for the first data subfeed and "photos by user 3, or by user 2 and not showing the sun" for the second data subfeed) that may result in different adjustments of the respective filters and different presentations of the related data subfeeds.

In a fourth scenario involving this third set of embodiments, a user action 144 may be used not only to update the filters of respective data groups, but to update other sets of information that is also compiled by the user 12. These categories may have category criteria, similar to the filter criteria of the filters for respective data subfeeds. Moreover, if a filter of a data subfeed is updated, the updates to the filter criteria of the filter may be propagated back to the category criteria category; e.g., upon updating at least one filter criterion, the embodiment may update the at least one category criterion based on the update of the at least one filter criterion. For example, the user 12 may define a category as a group of contacts comprising "friends" among the entire set of contacts represented in a social media network, and may specify category criteria designating individual contacts or groups of contacts for inclusion in the "friends" category. Similarly, a filter of a data subfeed may be generated as a "photos by friends" data subfeed, which may comprise selects data items 20 produced by particular contributors who are also designated as friends. If the user 12 chooses to remove some or all data items 20 produced by a particular contributor from the "friends" data subfeed, an inference may be drawn that this particular contributor is no longer a friend of the user 12, and category filter of the "friends" category may be adjusted to exclude the corresponding entity from the category. Those of ordinary skill in the art may involve many types of user actions 144, many types of inferences therefrom, and many resulting effects on the data subfeeds and/or filters that may be incorporated in the techniques discussed herein.

A third aspect that may vary among embodiments of these techniques relates to improvements in the application of one or more filters to the data feed 26. As a first example of this third aspect, redundancy in the presentation of data items 20 among the set of data subfeeds may be reduced by removing data items 20 from the second data subfeed 52 that are included in the first data subfeed 46. For example, if a data item 20 is found to be selected by one filter for inclusion in a particular data subfeed, the data item 20 may be removed from other data subfeeds or excluded from consideration by the filters of other data subfeeds. Alternatively or additionally, and as a second example of this third aspect, a data subfeed may be generated to include some or all of the data items 20 that are excluded from the other data subfeeds. This data subfeed may comprise an "everything else" data subfeed that presents data items 20 that are not contextually related to the data items 20 comprising the other data subfeeds (according to the criteria of the respective filters.)

Figure 11:
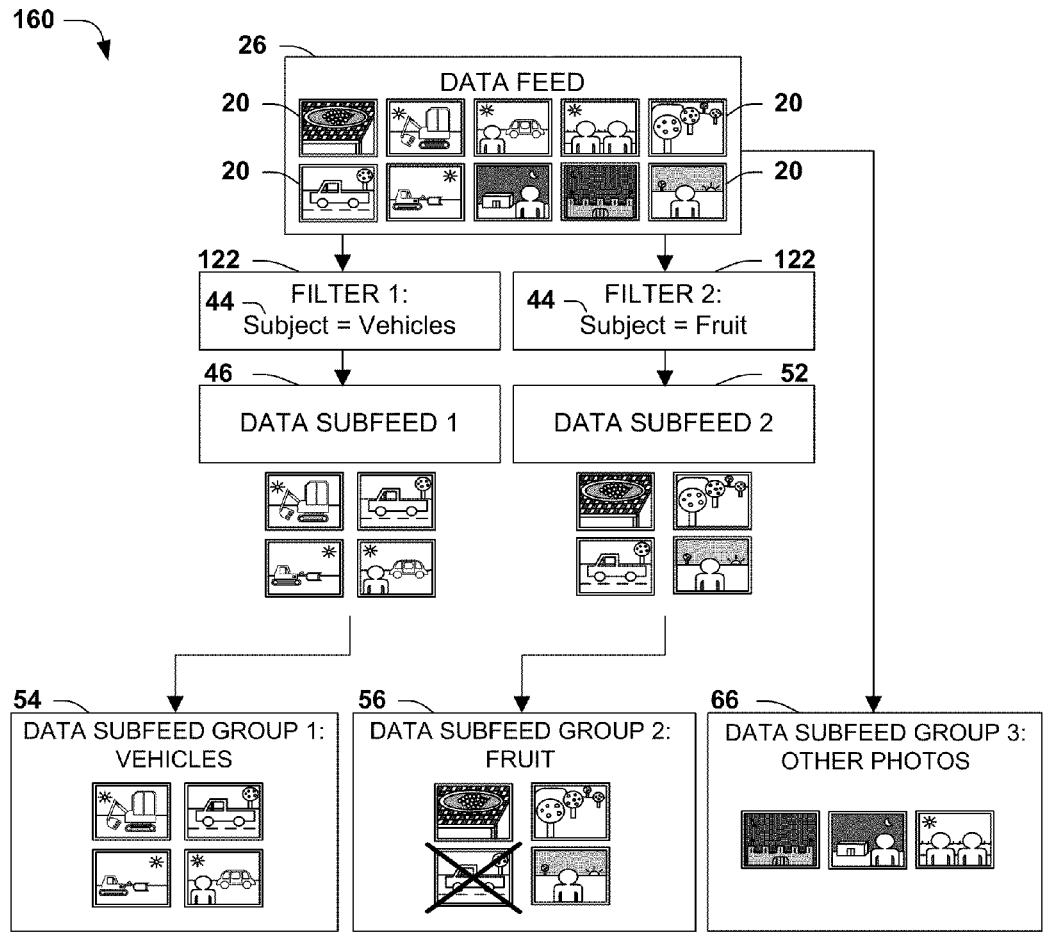
FIG. 11 is an illustration of an exemplary scenario featuring some improvements in the application of filters and the naming of data subfeeds.

FIG. 11 presents an exemplary scenario 160 featuring the adjustment of the application of the filters to a data feed 26 to improve the presentation of the data subfeed groups. The data feed 26 comprises data items 20 corresponding to photos, and a first filter 122 may have a filter criterion 44 that selects photos depicting a vehicle, while a second filter 122 may have a filter criterion 44 that selects photos depicting fruit (including a fruit tree.) Upon applying these filters, a first data subfeed 46 and a second data subfeed 52 are generated, each comprising a subset of the photos of the data feed 26. However, these data subfeeds may be adjusted to improve the presentation of the data feed 26. As a first example, it may be identified that a particular data item 20 (the photo of a truck and a fruit tree) has been selected for both data subfeeds, and may be removed from the second data subfeed 52 in order to reduce the redundant presentation of data items 20. As a second example, several photos may be identified as having been excluded by both filters 122, and may therefore be selected for inclusion in a third data feed, comprising an "everything else" group of data items 20. As a result, three data subfeed groups are presented: a first data subfeed group 54 for the first data subfeed 46 comprising photos of vehicles; a second data subfeed group 56 for the second data subfeed 52 comprising photos of fruit and fruit trees, but omitting the photo of the fruit tree and truck that is presented in the first data feed subgroup 54; and a third data feed subgroup 66 comprising the photos that have not been presented in the other data subfeed groups. Those of ordinary skill in the art may devise many techniques for adjusting the presentation of the data item subgroups according to the techniques discussed herein.

A fourth aspect that may vary among embodiments of these techniques relates to the manner of concurrently presenting the data subfeeds comprising the data feed 26. As a first example of this fourth aspect, the data subfeeds may be presented in many ways. In one such example, the data subfeeds may be presented as vertically aligned columns that are positioned laterally across the display 16; e.g., a first data subfeed may be presented as a first data subfeed column comprising horizontally aligned data items 20 of the first data subfeed, while a second data subfeed may be presented as a second data subfeed column comprising horizontally aligned data items 20 of the second data subfeed, where the second data subfeed column is vertically aligned with respect to the first data subfeed column. Other presentations may also be available, and may present some advantages and/or reduce disadvantages as compared with the columnar view when presented on particular displays. For example, the data subfeed groups may be presented as a set of horizontally aligned rows, where each data subfeed group is displayed as a set of vertically aligned data items 20. This presentation might be advantageous, e.g., when presenting a large number of data subfeeds, each having a small set of data items, on a comparatively tall display.

As a second example of this fourth aspect, the user 12 may be permitted to toggle between displaying the full data feed 26 and display the data subfeeds. For example, upon receiving a request from the user 12 to present the data feed 26, an embodiment may present on the display 16 a data feed group comprising the data items 20 of the data feed 26 (instead of the data subfeed groups); and upon receiving a request from the user 12 to present the data subfeeds, the embodiment may concurrently present on the display 16 the first data subfeed group comprising the data items of the first data subfeed and the second data subfeed group comprising the data items of the second data subfeed instead of the data feed group.

As a third example of this fourth aspect, the user 12 may be permitted to assign names to the data subfeeds; e.g., upon receiving a request from the user 12 to assign a data subfeed name to a data subfeed, the data subfeed name may be stored and related to the data subfeed; and when the data subfeed group of the data subfeed is subsequently presented, the data subfeed name may be presented with the contents of the data subfeed. Alternatively or additionally, upon receiving from the user 12 a group display request relating to the presenting of a data subfeed group (e.g., a request by the user 12 to display a particular data subfeed group in a particular region of the display 16), the data subfeed group of the data subfeed may be displayed according to the group display request. Moreover, in some embodiments, the group display request of the user 12 may be stored related to the data subfeed; and upon subsequently presenting the data subfeed group of the data subfeed on the display 16, the embodiment may retrieve a stored group display request related to the data subfeed, and may display the data subfeed group according to the stored group display request. For example, if the user 12 requests to display a particular data subfeed group in a region of the display 16 having a particular position, size, shape, zoom factor, opacity, etc., the user action may be stored as a group display request, which may be persistently applied to the data subfeed group during subsequent presentations thereof.

Figure 12:
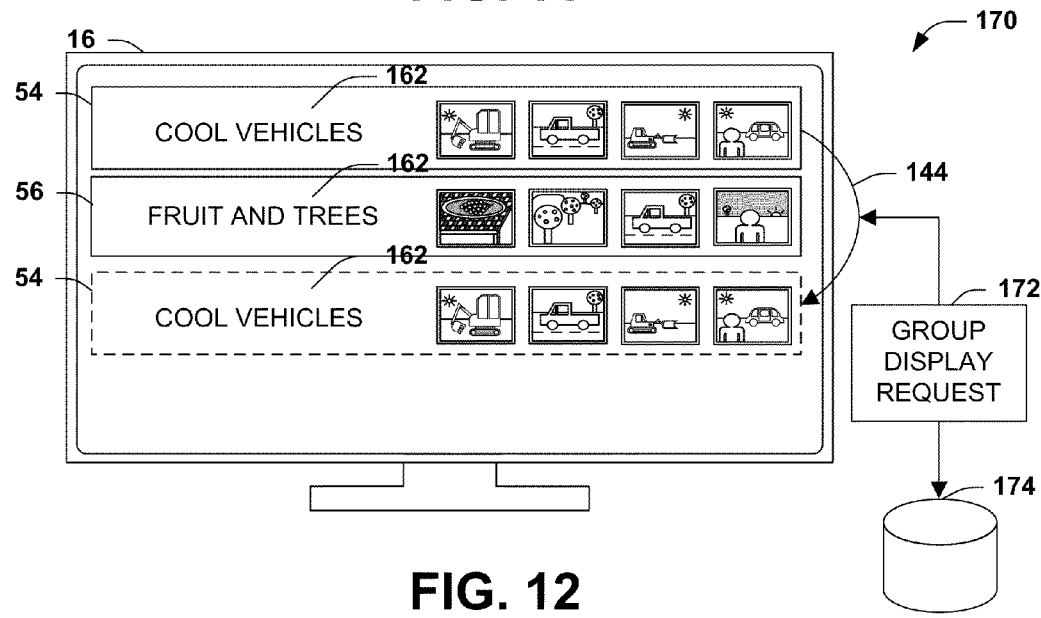
FIG. 12 is an illustration of an exemplary scenario featuring an alternative presentation of data subfeed groups and a user action representing a group display request relating thereto.

FIG. 12 presents an exemplary scenario 170 featuring some of these variations in the presentation of data subfeed groups. In this exemplary scenario 170, a first data subfeed group 54 representing a first data subfeed (comprising a set of photos depicting vehicles) and a second data subfeed group 56 representing a second data subfeed (comprising a set of photos depicting fruit or fruit trees) are presented on a display 16. However, in contrast with the exemplary presentations in other figures, the data subfeed groups in the exemplary scenario 170 of FIG. 12 are presented not as vertically aligned columns respectively featuring a set of data items 20, but as horizontally aligned rows, arranged in vertical series, respectively featuring a series of horizontally aligned data items 20. The data subfeed groups have been assigned data subfeed group names 162 by the user 12 (e.g., "Cool Vehicles" and "Fruit and Trees"), and these names may be persisted by storage in a data store 174 on behalf of the user 12 and presented within the respective data subfeed groups of the associated data subfeeds. Additionally, a user action 144 may be detected that represents a group display request 172, such as a request to relocate the displaying of the first data subfeed group 54 below the second data subfeed group 56, instead of above the second data subfeed group 56. This group display request 172 may be persisted by storage in the data store 174, and may be utilized when the first data subfeed group 54 and the second data subfeed group 56 are subsequently displayed on the monitor 16. Those of ordinary skill in the art may devise many ways of presenting the data subfeeds to the user while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
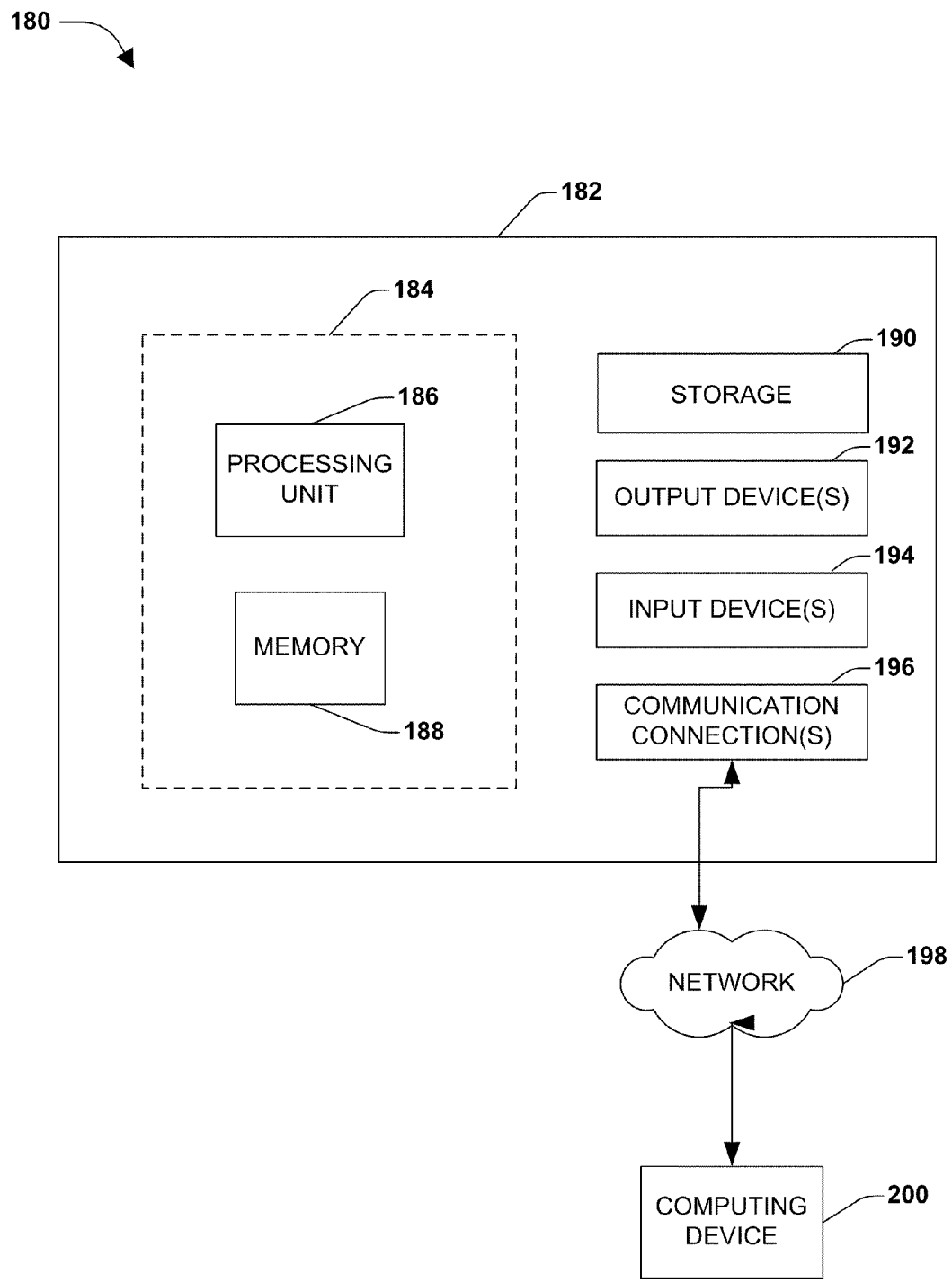
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 13 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 13 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 200 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a data feed comprising at least one data item, respective data items having content and at least one metadata item, on a display of a device having a processor, the method comprising:
    executing on the processor instructions configured to:
        compare the metadata items of respective data items of the data feed to criteria of a first filter to generate a first data subfeed;
        compare the metadata items of respective data items of the data feed to criteria of a second filter to generate a second data subfeed;
        remove data items from the second data subfeed that are included in the first data subfeed; and
        concurrently present on the display;
            within a first region of the display, the content of the data items of the first data subfeed;
                wherein presenting in the first region of the display a first data subfeed column comprising the content of the data items of the first data subfeed horizontally aligned within the first data subfeed column; and
            within a second region of the display not overlapping the first region, the content of the data items of the second data subfeed;
                wherein presenting in the second region of the display a second data subfeed column comprising the content of the data items of the second data subfeed horizontally aligned within the second data subfeed column, the second data subfeed column vertically aligned with respect to the first data subfeed column.

2. The method of claim 1, the data feed comprising a first data item retrieved from a first data item source and a second data item retrieved from a second data item source.

3. The method of claim 1, at least one filter comprising at least one filter criterion selected by a user from a criterion set comprising:
    an inclusion criterion specifying at least one metadata item whereby matching data items are included by the filter; and
    an exclusion criterion specifying at least one metadata item whereby matching data items are excluded by the filter.

4. The method of claim 1, at least one filter comprising at least one filter criterion inferred by identifying at least one commonality among the metadata items of respective data items in the data feed.

5. The method of claim 4:
    respective data items generated by at least one entity having a relationship with a user, and
    at least one commonality among metadata items of respective data items related to the relationships of the entities with the user.

6. The method of claim 1, at least one filter comprising at least one filter criterion inferred by:

identifying a user action associated with a data item;
identifying at least one relevant metadata item of the data item that may have motivated the user action; and
inferring at least one filter criterion of at least one filter based on the at least one relevant metadata item.

7. The method of claim 6:
the user action indicating a user interest of the user in the data item;
identifying the at least one relevant metadata item comprising: identifying at least one metadata item that may have motivated the user interest of the user in the data item; and
inferring the at least one filter criterion comprising: inferring at least one filter criterion based on the at least one relevant metadata item, where data items having the at least one relevant metadata item may motivate user interest of the user.

8. The method of claim 6:
the user action comprising a request to create a data subfeed comprising at least one data item; and
identifying the at least one relevant metadata item comprising: identifying at least one distinctive metadata item of the at least one data item.

9. The method of claim 6:
the user action comprising a request to add at least one data item to a data subfeed;
identifying the at least one relevant metadata item comprising: identifying at least one relevant metadata item of the data item having at least one commonality with the metadata items of the data items in the data subfeed; and
inferring the at least one filter criterion comprising: inferring at least one inclusion criterion based on the at least one relevant metadata item.

10. The method of claim 6:
the user action comprising a request to remove at least one data item from a data subfeed; and
identifying the at least one relevant metadata item comprising: identifying at least one relevant metadata item of the data item contrasting with the metadata items of the data items in the data subfeed; and
inferring the at least one filter criterion comprising: inferring at least one exclusion criterion based on the at least one relevant metadata item.

11. The method of claim 6:
the user defining at least one category having at least one category criterion related to at least one filter criterion of at least one filter, and
the method comprising: upon updating at least one filter criterion, update the at least one category criterion based on the update of the at least one filter criterion.

12. The method of claim 1, at least one filter of at least one data subfeed configured to include data items that are excluded by the filters of other data subfeeds.

13. The method of claim 1:
the instructions configured to, upon receiving a request from a user to assign a data subfeed name to a data subfeed, store the data subfeed name related to the data subfeed; and
presenting a data subfeed group comprising: presenting with the data subfeed group the data subfeed name of the data subfeed.

14. The method of claim 1, presenting the data subfeeds on the display comprising:
upon receiving a request from the user to present the data feed, present on the display the content of the data items of the data feed instead of the data subfeeds; and
upon receiving a request from the user to present the data subfeeds, concurrently present on the display:
within a first region of the display, the content of the data items of the first data subfeed; and
within a second region of the display not overlapping the first region, the content of the data items of the second data subfeed.

15. The method of claim 1, the instructions configured to, upon receiving from the user a group display request relating to presenting a data subfeed group, display the content of the data items data of the data subfeed according to the group display request.

16. The method of claim 15, the instructions configured to:
store the group display request of the user related to the data subfeed; and
upon subsequently presenting the data subfeed on the display:
retrieve a stored group display request related to the data subfeed, and
display the content of the data items of the data subfeed according to the stored group display request.

17. A computer-readable storage device comprising instructions that, when executed on a processor of a device having a display, cause the device to present on the display a data feed comprising at least one data item, respective data items having content and at least one metadata item by:
comparing the metadata items of respective data items of the data feed to criteria of a first filter to generate a first data subfeed;
comparing the metadata items of respective data items of the data feed to criteria of a second filter to generate a second data subfeed;
removing data items from the second data subfeed that are included in the first data subfeed; and
concurrently presenting on the display;
in a first region of the display, the content of the data items of the first data subfeed;
wherein presenting in the first region of the display a first data subfeed column comprising the content of the data items of the first data subfeed horizontally aligned within the first data subfeed column; and
in a second region of the display not overlapping the first region, the content of the data items of the second data subfeed
wherein presenting in the second region of the display a second data subfeed column comprising the content of the data items of the second data subfeed horizontally aligned within the second data subfeed column, the second data subfeed column vertically aligned with respect to the first data subfeed column.

18. A computer-readable storage device comprising instructions that, when executed on a processor of a device having a display, cause the device to present on the display to a user a data feed comprising at least one data item, respective data items having content and at least one metadata item and generated by at least one entity having a relationship with the user, by:
generating at least one filter upon receiving from a user a generation of a filter comprising at least one filter criterion selected from a set of filter criteria comprising:
an inclusion criterion specifying at least one metadata item whereby matching data items are included by the filter, and
an exclusion criterion specifying at least one metadata item whereby matching data items are excluded by the filter;

generating at least one filter comprising at least one filter criterion representing at least one commonality among metadata items of respective data items related to the relationships of the entities with the user;
generating at least one filter configured to include data items that are excluded by the filters of other data subfeeds;
removing data items from the second data subfeed that are included in the first data subfeed;
upon receiving a request from the user to present the data feed, present on the display a data feed group comprising the content of at least one data item of the data feed instead of data subfeed groups;
upon receiving a request from the user to present the data subfeeds, concurrently present on the display, instead of the data feed:
  within a first region of the display, the content of the data items of a first data subfeed, the data items arranged as a first data subfeed column comprising horizontally aligned data items comprising the first data subfeed, and
  within a first region of the display not overlapping the first region, the content of the data items of a second data subfeed, the data items arranged as a second data subfeed column comprising horizontally aligned data items comprising the second data subfeed, the second data subfeed column vertically aligned with respect to the first data subfeed column;
upon detecting a user action of the user associated with at least one data item, generating at least one filter comprising at least one filter criterion representing at least one filter criterion inferred by:
  identifying at least one relevant metadata item of the data item that may have motivated the user action, and
  inferring at least one filter criterion of at least one filter based on the at least one relevant metadata item;
comparing the metadata items of respective data items of the data feed to criteria of a first filter to generate a first data subfeed;
comparing the metadata items of respective data items of the data feed to criteria of a second filter to generate a second data subfeed;
upon detecting a user action of the user comprising a request to create a data subfeed comprising at least one data item, generating a filter comprising at least one filter criterion based on at least one distinctive metadata item of the at least one data item;
upon detecting a user action of the user to add at least one data item to a data subfeed:
  identifying at least one relevant metadata item of the data item having at least one commonality with the metadata items of the data items in the data subfeed, and
  inferring the at least one filter criterion comprising: inferring at least one inclusion criterion based on the at least one relevant metadata item;
upon detecting a user action of the user to remove least one data item from a data subfeed:
  identifying the at least one relevant metadata item comprising: identifying at least one relevant metadata item of the data item contrasting with the metadata items of the data items in the data subfeed, and
  inferring the at least one filter criterion comprising: inferring at least one exclusion criterion based on the at least one relevant metadata item;
upon receiving a request from a user to assign a data subfeed name to a data subfeed:
  storing the data subfeed name related to the data subfeed, and
  presenting a data subfeed group comprising: presenting with the data subfeed group the data subfeed name of the data subfeed; and
upon receiving from the user a group display request relating to presenting a data subfeed group:
  display the data subfeed group of the data subfeed according to the group display request;
  store the group display request of the user related to the data subfeed; and
  upon subsequently presenting the data subfeed group of the data subfeed on the display:
    retrieve a stored group display request related to the data subfeed, and
    display the data subfeed group according to the stored group display request.

* * * * *